(12) United States Patent
Kakuta et al.

(10) Patent No.: US 12,420,533 B2
(45) Date of Patent: Sep. 23, 2025

(54) POLYETHYLENE-BASED RESIN MULTILAYER FOAM SHEET AND METHOD FOR PRODUCING SAME

(71) Applicant: JSP CORPORATION, Chiyoda-ku (JP)

(72) Inventors: Hirotoshi Kakuta, Tochigi (JP); Mikidai Fujita, Tochigi (JP); Naoya Katsuyama, Tochigi (JP)

(73) Assignee: JSP CORPORATION, Chiyoda-ku (JP)

( * ) Notice: Subject to any disclaimer, the term of this patent is extended or adjusted under 35 U.S.C. 154(b) by 86 days.

(21) Appl. No.: 18/258,874

(22) PCT Filed: Oct. 1, 2021

(86) PCT No.: PCT/JP2021/036370
§ 371 (c)(1),
(2) Date: Jun. 22, 2023

(87) PCT Pub. No.: WO2022/137710
PCT Pub. Date: Jun. 30, 2022

(65) Prior Publication Data
US 2024/0042743 A1 Feb. 8, 2024

(30) Foreign Application Priority Data
Dec. 25, 2020 (JP) ................. 2020-216578

(51) Int. Cl.
| | | |
|---|---|---|
| *B32B 27/06* | (2006.01) | |
| *B32B 5/18* | (2006.01) | |
| *B32B 27/30* | (2006.01) | |
| *B32B 27/32* | (2006.01) | |
| *B32B 37/15* | (2006.01) | |

(52) U.S. Cl.
CPC .............. *B32B 27/065* (2013.01); *B32B 5/18* (2013.01); *B32B 27/30* (2013.01); *B32B 27/32* (2013.01); *B32B 37/153* (2013.01); *B32B 2250/02* (2013.01); *B32B 2264/108* (2013.01); *B32B 2266/025* (2013.01); *B32B 2305/022* (2013.01); *B32B 2307/202* (2013.01); *B32B 2307/7376* (2023.05); *B32B 2323/046* (2013.01); *B32B 2331/04* (2013.01); *B32B 2333/12* (2013.01); *B32B 2439/00* (2013.01)

(58) Field of Classification Search
CPC ....... B29C 48/022; B29C 48/07; B29C 48/10; B29C 48/21; B32B 2250/02; B32B 2250/03; B32B 2250/04; B32B 2264/108; B32B 2266/025; B32B 2270/00; B32B 2305/022; B32B 2307/202; B32B 2307/718; B32B 2307/72; B32B 2307/7376; B32B 2323/046; B32B 2331/04; B32B 2333/12; B32B 2439/00; B32B 27/065; B32B 27/18; B32B 27/20; B32B 27/30; B32B 27/32; B32B 37/153; B32B 5/18; B32B 7/02; B32B 7/025; B32B 7/027
See application file for complete search history.

(56) References Cited

U.S. PATENT DOCUMENTS

| | | | | |
|---|---|---|---|---|
| 4,066,576 A | * | 1/1978 | Bork ...................... | C08L 23/04 |
| | | | | 524/495 |
| 4,696,765 A | * | 9/1987 | Kakizaki ................. | C08K 3/04 |
| | | | | 524/495 |

FOREIGN PATENT DOCUMENTS

| | | |
|---|---|---|
| CN | 102150225 A | 8/2011 |
| CN | 104619496 A | 5/2015 |
| CN | 107108942 A | 8/2017 |
| CN | 108081732 A | 5/2018 |
| JP | 54-107984 A | 8/1979 |
| JP | 58-101729 U | 7/1983 |
| JP | 59-43122 U | 3/1984 |
| JP | 61-31 440 A | 2/1986 |
| JP | 62-231728 A | 10/1987 |

(Continued)

OTHER PUBLICATIONS

Yu et al., "Conductive Polymer Blends Filled with Carbon Black: Positive Temperature Coefficient Behavior," Polymer Engineering and Science, Sep. 1999, vol. 39, No. 9. (Year: 1999).*
International Search Report mailed on Nov. 22, 2021 in PCT/JP2021/036370 filed on Oct. 1, 2020 (3 pages).
Combined Taiwanese Office Action and Search Report issued Jan. 6, 2025, in Taiwanese Patent Application No. 110137691 (with unedited computer-generated English translation), 25 pages.
Written Opinion of the International Searching Authority issued Nov. 22, 2021 in PCT/JP2021/036370 (submitting English Translation Only), 4 pages.
Extended European Search Report issued Sep. 11, 2024 in European Patent Application No. 21909868.8, 72 pages.
Combined Chinese Office and Search Report issued May 19, 2025 in Chinese Patent Application No. 202160071905.6 (with unedited computer-generated English translation of Office Action only), 15 pages.

(Continued)

*Primary Examiner* — Hai Vo
(74) *Attorney, Agent, or Firm* — Oblon, McClelland, Maier & Neustadt, L.L.P.

(57) ABSTRACT

A polyethylene-based resin multilayer foam sheet may include a polyethylene-based resin foam layer containing a polyethylene-based resin (A) as a base resin, and a conductive layer laminated on at least one side of the foam layer. The conductive layer contains: a mixed resin of one or more polyethylenes (B) of low-density polyethylenes and/or linear low-density polyethylenes and an ethylene-based copolymer (C) having a structural unit derived from ethylene and a structural unit derived from a monomer having a polar group; and conductive carbon. The conductive carbon blended in the conductive layer may be in a range of from 3 to 15 wt. %. The difference, $Tm_B - Tm_C$, between the melting point $Tm_B$ of the polyethylene (B) and the melting point $Tm_C$ of the ethylene-based copolymer (C) each contained in the conductive layer may be in a range of from 30 to 80° C.

16 Claims, No Drawings

(56) References Cited

FOREIGN PATENT DOCUMENTS

| | | | |
|---|---|---|---|
| JP | 62-231739 | A | 10/1987 |
| JP | 2-204034 | A | 8/1990 |
| JP | 2001-347589 | A | 12/2001 |
| JP | 2008-308695 | A | 12/2008 |
| JP | 2010-214625 | A | 9/2010 |
| JP | 2011-178957 | A | 9/2011 |
| JP | 2013-35177 | A | 2/2013 |
| JP | 2020-192701 | A | 12/2020 |

OTHER PUBLICATIONS

Second Office Action issued in Taiwanese Patent Application No. 110137691, issued on May 21, 2025. (with English translation) 19 pages total.

* cited by examiner

POLYETHYLENE-BASED RESIN MULTILAYER FOAM SHEET AND METHOD FOR PRODUCING SAME

CROSS-REFERENCE TO RELATED APPLICATIONS

The present application is the national stage of international application PCT/JP2021/036370, filed on Oct. 1, 2021, and claims the benefit of the filing date of Japanese Appl. No. 2020-216578, filed on Dec. 25, 2020.

TECHNICAL FIELD

The present invention relates to a polyethylene-based resin multilayer foam sheet and a method for producing the sheet.

BACKGROUND ART

Polyethylene-based resin foam sheets that have a polyethylene-based resin as a base resin are high in flexibility and excellent in shock absorption, and thus are used for applications such as cushioning materials and packaging materials. Among these applications, for example, cushioning materials and packaging materials that are used for packaging electronic devices, electronic parts, and the like may be required to have conductivity in addition to protectability for objects to be packaged.

As an example of a conductive foam sheet, for example, Patent Document 1 describes a conductive polyethylene-based resin foam sheet obtained by mixing a polyethylene-based resin and a master batch containing conductive carbon and performing extrusion foaming on the resultant mixture.

In addition, Patent Document 2 describes therein a conductive polyethylene-based resin multilayer foam sheet obtained by heating and foaming a foamable multilayer thermoplastic resin sheet including at least two layers of a non-conductive polyethylene-based resin containing a pyrolytic foaming agent and a conductive thermoplastic resin layer containing conductive carbon.

PRIOR ART LITERATURE

Patent Documents

Patent Document 1: JP-A-S61-31440
Patent Document 2: JP-A-S62-231728

SUMMARY OF THE INVENTION

Problems to be Solved by the Invention

In order to impart conductivity to the foam sheet in Patent Document 1, it is necessary to blend a relatively large amount of conductive carbon therein. However, when the amount of the conductive carbon blended in the foam sheet is excessively increased, it may hinder the foamability and impair properties such as a cushioning property required for use as a cushioning material or a packaging material.

Similarly for the foam sheet in Patent Document 2, it is necessary to blend a relatively large amount of conductive carbon in the conductive thermoplastic resin layer for adjusting the surface resistivity to be $1 \times 10^7 \Omega$ or less.

In addition, the foam sheets in Patent Documents 1 and 2 may possibly cause the conductive carbon to fall off from the foam sheet and contaminate surroundings of the foam sheet.

In particular, the increased amount of the conductive carbon blended in the foam sheet may possibly make the conductive carbon more likely to fall off from the foam sheet, and make the conductive carbon more likely to contaminate surroundings of the foam sheet. In addition, when the foam sheet is used as a packaging material, the conductive carbon falling from the foam sheet may possibly transfer to an object to be packaged, and contaminate the object to be packaged.

The present invention has been made in view of such a background, and an object of the present invention is to provide a polyethylene-based resin multilayer foam sheet that is provided with conductivity and enables to reduce the falling of the conductive carbon from the foam sheet, and a production method therefor.

Means for Solving the Problems

An aspect of the present invention is a polyethylene-based resin multilayer foam sheet including:
a polyethylene-based resin foam layer containing a polyethylene-based resin (A) as a base resin; and
a conductive layer laminated on at least one side of the polyethylene-based resin foam layer, wherein
the conductive layer contains:
a mixed resin of one kind of, or two or more kinds of polyethylenes (B) selected from the group consisting of low-density polyethylenes and linear low-density polyethylenes and an ethylene-based copolymer (C) having a structural unit derived from ethylene and a structural unit derived from a monomer having a polar group; and
conductive carbon blended in the mixed resin,
an amount of the conductive carbon blended in the conductive layer is 3% by mass or more and 15% by mass or less, and
a difference $Tm_B - Tm_C$ between a melting point $Tm_B$ of the polyethylene (B) contained in the conductive layer and a melting point $Tm_C$ of the ethylene-based copolymer (C) contained in the conductive layer is 30° C. or more and 80° C. or less.

In addition, another aspect of the present invention is a method for producing a polyethylene-based resin multilayer foam sheet, including coextruding a foam-layer forming melt to form a polyethylene-based resin foam layer and a conductive-layer forming melt to form a conductive layer so that a polyethylene-based resin multilayer foam sheet comprising the polyethylene-based resin foam layer and the conductive layer laminated on at least one side of the polyethylene-based resin foam layer is produced, wherein
the foam-layer forming melt is obtained by kneading a polyethylene-based resin (A) as a base resin and a physical foaming agent,
the conductive-layer forming melt is obtained by kneading one kind of, or two or more kinds of polyethylenes (B) selected from the group consisting of low-density polyethylenes and linear low-density polyethylenes, an ethylene-based copolymer (C) having a structural unit derived from ethylene and a structural unit derived from a monomer having a polar group, and conductive carbon,
an amount of the conductive carbon blended in the conductive-layer forming melt is 3% by mass or more and 15% by mass or less, and
a difference $Tm_B - Tm_C$ between a melting point $Tm_B$ of the polyethylene (B) and a melting point $Tm_C$ of the ethylene-based copolymer (C) is 30° C. or more and 80° C. or less.

Effects of the Invention

In the polyethylene-based resin multilayer foam sheet (hereinafter, referred to as a "multilayer foam sheet" as appropriate), even when the blended amount of the conductive carbon is relatively small, conductivity can be imparted to the multilayer foam sheet by adjusting the composition of the conductive layer according to the specific aspect as mentioned above. In addition, in the conductive layer that has the specific composition mentioned above, the falling of the conductive carbon can be curtailed.

In the production method according to the aspect mentioned above, the foam-layer forming melt and the conductive-layer forming melt respectively having the specific compositions are coextruded to thereby obtain a multilayer foam sheet. In the production method, even when the blended amount of the conductive carbon is relatively small, conductivity can be imparted to the multilayer foam sheet by adjusting the composition of the conductive-layer forming melt according to the specific aspect as mentioned above. In addition, the production method makes it possible to obtain a multilayer foam sheet in which the falling of the conductive carbon can be curtailed.

As described above, the above-mentioned aspects provide a polyethylene-based resin multilayer foam sheet that is provided with conductivity and enables to reduce the falling of the conductive carbon from the foam sheet, and a production method therefor.

MODES FOR CARRYING OUT THE INVENTION (Polyethylene-Based Resin Multilayer Foam Sheet)

The multilayer foam sheet has two or more layers including a polyethylene-based resin foam layer and a conductive layer laminated on at least one side of the polyethylene-based resin foam layer. Each layer included in the multilayer foam sheet is laminated on and bonded to the adjacent layer. Each layer in the multilayer foam sheet is preferably laminated on and bonded to the adjacent layer by coextrusion.

For example, the multilayer foam sheet may be composed of two layers, that is, a polyethylene-based resin foam layer and a conductive layer laminated on one side of the polyethylene-based resin foam layer. Alternatively, the multilayer foam sheet may be composed of three layers, that is, a polyethylene-based resin foam layer and conductive layers laminated on both sides of the polyethylene-based resin foam layer. Furthermore, a layer that has a different composition from the polyethylene-based resin foam layer and the conductive layer may be provided between the polyethylene-based resin foam layer and the conductive layer in the multilayer foam sheet and/or on the outermost surface of the multilayer foam sheet. From the viewpoint of more reliably avoiding damage to an object to be packaged such as an electronic device or an electronic part due to static electricity, the conductive layer is preferably laminated on both sides of the polyethylene-based resin foam layer, and the conductive layer is more preferably located on the surface of the multilayer foam sheet.

<Overall Thickness>

The overall thickness of the multilayer foam sheet is preferably set to be 0.05 mm or more and 3.0 mm or less. By adjusting the overall thickness of the multilayer foam sheet to be 0.05 mm or more, more preferably 0.1 mm or more, still more preferably 0.2 mm or more, the cushioning property of the multilayer foam sheet can be further enhanced. In addition, by adjusting the overall thickness of the multilayer foam sheet to be 3.0 mm or less, more preferably 2.0 mm or less, still more preferably 1.5 mm or less, particularly preferably 1.2 mm or less, the handleability of the multilayer foam sheet can be further enhanced, and an object to be packaged can be more easily packed.

The following is a method for measuring the overall thickness of the multilayer foam sheet. First, the multilayer foam sheet is cut along a plane perpendicular to the extrusion direction. At this cut surface, ten measurement locations are set in such a manner that the length of the cut surface in the width direction (that is, a direction perpendicular to both the extrusion direction and the thickness direction) is equally divided into eleven parts. The thickness at each measurement location is measured by a method such as observing these measurement locations using a microscope. The arithmetic mean value of these thicknesses is then defined as the overall thickness of the multilayer foam sheet.

<Apparent Density>

The apparent density of the multilayer foam sheet is preferably set to be 30 kg/m3 or more and 150 kg/m$^3$ or less. By adjusting the apparent density of the multilayer foam sheet to be 30 kg/m$^3$ or more, more preferably 35 kg/m$^3$ or more, still more preferably 40 kg/m$^3$ or more, sufficient strength as a cushioning material or a packaging material can be easily secured. In addition, by adjusting the apparent density of the multilayer foam sheet to be 150 kg/m$^3$ or less, more preferably 120 kg/m$^3$ or less, still more preferably 100 kg/m3 or less, the lightweightness and flexibility of the multilayer foam sheet can be sufficiently secured, and the cushioning property of the multilayer foam sheet can be further enhanced.

The following is a method for measuring the apparent density of the multilayer foam sheet. First, the multilayer foam sheet is cut in the width direction, and a test piece is collected. The shape of the test piece may be, for example, a rectangle whose dimension in the longitudinal direction is equal to the overall width of the multilayer foam sheet and whose dimension in the lateral direction is 10 cm. The mass (unit: g) of the test piece is divided by the area of the test piece, and then subjected to a unit conversion to calculate the basis weight of the multilayer foam sheet, that is, the mass per 1 m$^2$ of the multilayer foam sheet (unit: g/m$^2$). The basis weight of the multilayer foam sheet is divided by the overall thickness of the multilayer foam sheet which has been obtained by the method described above, and then a unit conversion is performed thereon to thereby calculate the apparent density (unit: kg/m$^3$) of the multilayer foam sheet.

<Surface Resistivity>

The multilayer foam sheet preferably has a surface resistivity of $1\times10^3\Omega$ or more and $1\times10^7\Omega$ or less on a surface thereof on a side having the conductive layer provided thereon. Because the multilayer foam sheet with the surface resistivity in such a range makes it possible to easily remove static electricity charged in an object to be packaged or the like, it is suitable for use as a cushioning material or a packaging material for an electronic part, an electronic device, or the like. From the same viewpoint, the surface resistivity of the multilayer foam sheet is more preferably set to be $5\times10^6\Omega$ or less.

The measurement method for the surface resistivity of the multilayer foam sheet is performed in accordance with JIS K6271-1: 2015. Specifically, first, a test piece in a square shape of 100 mm on a side is collected from the multilayer foam sheet. After electrodes are attached to the surface of the test piece on the side having the conductive layer provided thereon, a voltage of 1 V is applied across the electrodes in an atmosphere at a temperature of 23° C. and a relative humidity of 50%. Then, the surface resistivity (unit: Ω) at the time after a lapse of 1 minute from the application of the voltage is regarded to be the surface resistivity of the multilayer foam sheet.

[Polyethylene-Based Resin Foam Layer]

The polyethylene-based resin foam layer is a foamed body that includes a polyethylene-based resin (A) as a base resin.

<Polyethylene-Based Resin (A)>

In this specification, the polyethylene-based resin means a resin including a structural unit derived from ethylene at 50 mol % or more. For example, polyethylenes such as a high-density polyethylene (that is, an HDPE), a low-density polyethylene (that is, an LDPE), and a linear low-density polyethylene (that is, an LLDPE), an ethylene-based copolymer containing a structural unit derived from ethylene at 50 mol % or more, such as an ethylene-vinyl acetate copolymer (that is, an EVA), and the like can be used as the polyethylene-based resin (A).

It is noted that the low-density polyethylene exemplified as the polyethylene-based resin (A) means a polyethylene which has a long-chain branched structure and of which a density is 910 kg/m$^3$ or more and less than 930 kg/m$^3$, the linear low-density polyethylene means a polyethylene which is a copolymer of ethylene and an α-olefin having 4 to 8 carbon atoms, of which molecular chains are substantially linear, and of which a density is 910 kg/m$^3$ or more and less than 930 kg/m$^3$, and the high-density polyethylene means a polyethylene which is an ethylene homopolymer or a copolymer of ethylene and an α-olefin having 4 to 8 carbon atoms and of which a density is 930 kg/m$^3$ or more.

The polyethylene-based resin foam layer may contain therein one kind of polyethylene-based resin (A) selected from the group consisting of ethylene homopolymers and ethylene-based copolymers, or may contain therein two or more kinds of polyethylene-based resins (A) selected therefrom. The polyethylene-based resin (A) preferably includes therein a structural unit derived from ethylene at 60 mol % or more, more preferably 70 mol % or more.

From the viewpoint of further improving the flexibility, cushioning property, and foamability of the multilayer foam sheet, the polyethylene-based resin foam layer preferably contains, as the polyethylene-based resin (A), a low-density polyethylene at 50% by mass or more, more preferably 80% by mass or more, still more preferably 90% by mass or more, and particularly preferably 100% by mass, that is, it is particularly preferable that the base resin of the polyethylene-based resin foam layer is made only of a low-density polyethylene.

The polyethylene-based resin (A) preferably has a melting point $Tm_A$ of 100° C. or higher and 135° C. or lower. By adjusting the melting point $Tm_A$ of the polyethylene-based resin (A) to fall within the range mentioned above, a foam layer that is excellent in extrusion foamability and excellent in cushioning property can be stably formed. From such a viewpoint, the melting point $Tm_A$ of the polyethylene-based resin (A) is preferably set to be 100° C. or higher and 130° C. or lower, more preferably 105° C. or higher and 120° C. or lower, still more preferably 108° C. or higher and 115° C. or lower.

The melting point $Tm_A$ of the polyethylene-based resin (A) can be measured by a testing method for transition temperature of plastics in accordance with JIS K7121: 2012. First, in accordance with "the case of measurement of the melting temperature after a definite heat treatment", the condition of the test piece is adjusted at a heating rate and a cooling rate of 10° C./min. Thereafter, heat flux DSC (that is, differential scanning calorimetry) is performed at a heating rate set to 10° C./min to obtain a DSC curve. The peak temperature of the endothermic peak of the obtained DSC curve is regarded to be the melting point. It is noted that when multiple endothermic peaks appear in the DSC curve, the peak temperature of the melting peak having the largest area with reference to the baseline on the high-temperature side is regarded to be the melting point.

The melt flow rate (MFR) of the polyethylene-based resin (A) is, for excellent extrusion foamability, preferably set to be 0.5 g/10 min or more and 15 g/10 min or less, more preferably 1 g/10 min or more and 8 g/10 min or less, still more preferably 1.5 g/10 min or more and 5 g/10 min or less. It is noted that the MFR of the polyethylene-based resin in this specification has a value measured under the conditions of testing temperature: 190° C. and load: 2.16 kg, based on JIS K7210-1: 2014.

<Other Polymers>

The polyethylene-based resin foam layer may contain polymers other than the polyethylene-based resin (A) that serves as a base resin to the extent that the action and effect described above are not impaired. Examples of the polymers other than the polyethylene-based resin (A) include thermoplastic resins such as polystyrene-based resins, and elastomers such as ethylene-propylene rubber and styrene-butadiene-styrene block copolymers. The content of the polymers other than the polyethylene-based resin (A) in the polyethylene-based resin foam layer is, based on 100 parts by mass of the polyethylene-based resin (A), preferably 20 parts by mass or less, more preferably 10 parts by mass or less, still more preferably 5 parts by mass or less, and is particularly preferably 0 parts by mass, that is, the polyethylene-based resin foam layer contains only the polyethylene-based resin (A) as a polymer component constituting the foam layer.

<Additive>

The polyethylene-based resin foam layer may include therein additives such as a cell adjusting agent, an antioxidant, a thermal stabilizer, a weathering agent, an ultraviolet absorber, a flame retardant, a filler, and an antibacterial agent. The amount of the additives blended in the polyethylene-based resin foam layer is, for example, preferably set to be 10 parts by mass or less, more preferably 5 parts by mass or less, still more preferably 3 parts by mass or less, based on 100 parts by mass of the polyethylene-based resin (A).

[Conductive Layer]

The conductive layer is laminated on one or both sides of the polyethylene-based resin foam layer. The base resin of the conductive layer is a mixed resin of a polyethylene (B) and an ethylene-based copolymer (C). The conductive layer is preferably non-foamed from the viewpoint of improving the conductivity, handleability, and appearance of the multilayer foam sheet. As long as the handleability and the like of the multilayer foam sheet are not impaired, however, the conductive layer may include therein very small cells in small amounts.

<Polyethylene (B)>

The conductive layer contains therein one kind of, or two or more kinds of polyethylenes (B) selected from the group consisting of low-density polyethylenes and linear low-density polyethylenes. The low-density polyethylene exemplified as the polyethylene (B) refers to a polyethylene that has a long-chain branched structure, with a density of 910 kg/m$^3$ or more and less than 930 kg/m$^3$, and the linear low-density polyethylene refers to a polyethylene that is a copolymer of ethylene and an α-olefin having 4 to 8 carbon atoms, with molecular chains substantially linear, and with a density of 910 kg/m³ or more and less than 930 kg/m³. Above all, the polyethylene (B) is preferably a low-density polyethylene. The melting point $Tm_B$ of the polyethylene (B) is preferably 100° C. or higher and 120° C. or lower, more preferably 102° C. or higher and 115° C. or lower. When the melting point $Tm_B$ of the polyethylene (B) falls within the range mentioned above, the conductive layer can be stably laminated on and bonded to the polyethylene-based resin foam layer even in the case of producing the multilayer foam sheet by coextrusion. It is noted that the method for measuring the melting point $Tm_B$ of the polyethylene (B) is the same as the method for measuring the melting point $Tm_A$ of the polyethylene-based resin (A) described above.

The melt flow rate of the polyethylene (B) at the temperature of 190° C. and under the load of 2.16 kg is preferably 5 g/10 min or more and 80 g/10 min or less, more preferably 10 g/10 min or more and 65 g/10 min or less, still more preferably 12 g/10 min or more and 50 g/10 min or less. By adjusting the melt flow rate of the polyethylene (B) to fall within the specific range mentioned above, the adhesiveness between the conductive layer and the polyethylene-based resin foam layer can be further enhanced. In addition, in this case, the conductivity of the multilayer foam sheet can be more stably developed.

<Ethylene-Based Copolymer (C)>

The ethylene-based copolymer (C) in the conductive layer has at least a structural unit derived from ethylene and a structural unit derived from a monomer having a polar group. The ethylene-based copolymer (C) may be, for example, a copolymer of ethylene and a monomer having a polar group, or a copolymer of ethylene, a monomer having a polar group, and another monomer other than the ethylene and the monomer having a polar group. The amount of the structural unit derived from the other monomer contained in the ethylene-based copolymer (C) is preferably 10% by mass or less, more preferably 5% by mass or less, still more preferably 3% by mass or less, most preferably 0% by mass, that is, the ethylene-based copolymer (C) is a copolymer of ethylene and a monomer having a polar group.

When the base resin of the conductive layer is a mixed resin of the polyethylene (B) and the ethylene-based copolymer (C), the multilayer foam sheet has conductivity, and can reduce the conductive carbon falling from the multilayer foam sheet. The reason therefor is not necessarily clear at present, but is considered as follows.

In general, when conductive carbon is dispersed in a thermoplastic resin such as a polyethylene-based resin, adjacent conductive carbon particles are present close to each other at a certain distance or less, thereby causing the conductive carbon particles to form a conductive network and developing conductivity.

In the multilayer foam sheet, the polyethylene (B) and the ethylene-based copolymer (C) are incompatible with each other, and a phase mainly composed of the polyethylene (B) and a phase mainly composed of the ethylene-based copolymer (C) are thus formed in the conductive layer. When such a morphology is formed in the conductive layer, it is conceivable that the conductive carbon is unevenly distributed in any one of the phase composed of the polyethylene (B) and the phase composed of the ethylene-based copolymer (C). Then, the conductive carbon unevenly distributed in any of the phases, thereby making the conductive carbon particles more likely to form a conductive network. As a result, conductivity is considered to be easily developed even with the small amount of the conductive carbon blended.

In addition, when the conductive carbon is unevenly distributed in any one of the phase composed of the polyethylene (B) and the phase composed of the ethylene-based copolymer (C) in the conductive layer, the amount of the conductive carbon exposed at the surface of the conductive layer can be reduced. Therefore, it can be said that the amount of the conductive carbon falling from the multilayer foam sheet can be reduced. In conclusion, the object to be packaged can be prevented from being contaminated by the conductive carbon which falls from the multilayer foam sheet and transfers to the object.

Examples of the ethylene-based copolymer (C) include an ethylene-vinyl acetate copolymer (that is, an EVA), an ethylene-methyl methacrylate copolymer (that is, an EMMA), an ethylene-methyl acrylate copolymer (that is, an EMA), an ethylene-methacrylic acid copolymer (that is, an EMAA), an ethylene-acrylic acid copolymer (that is, an EAA), an ethylene-ethyl methacrylate copolymer (that is, an EEMA), an ethylene-ethyl acrylate copolymer (that is, an EEA), and an ethylene-butyl acrylate copolymer (that is, an EBA). From the viewpoint of further enhancing the conductivity of the multilayer foam sheet and further reducing the conductive carbon falling, the conductive layer preferably contains one kind of, or two or more kinds of ethylene-based copolymers (C) selected from the group consisting of an ethylene-vinyl acetate copolymer and an ethylene-methyl methacrylate copolymer, and more preferably contains therein an ethylene-vinyl acetate copolymer.

The content of the structural unit derived from the monomer having a polar group in the ethylene-based copolymer (C) is preferably 30% by mass or more and 50% by mass or less. By adjusting the content of the structural unit derived from the monomer having a polar group in the ethylene-based copolymer (C) to be 30% by mass or more, the conductivity of the multilayer foam sheet can be further improved, and the conductive carbon can be more effectively kept from falling from the multilayer foam sheet. From the viewpoint of further enhancing these actions and effects, the content of the structural unit derived from the monomer having a polar group in the ethylene-based copolymer (C) is more preferably set to be more than 30% by mass, still more preferably 35% by mass or more, particularly preferably 40% by mass or more, most preferably more than 40% by mass.

In addition, by adjusting the content of the structural unit derived from the monomer having a polar group in the ethylene-based copolymer (C) to be 50% by mass or less, the handleability of the multilayer foam sheet can be further improved, and the production stability can be further improved in laminating the conductive layer on the polyethylene-based resin foam layer. From the viewpoint of further enhancing these actions and effects, the content of the structural unit derived from the monomer having a polar group in the ethylene-based copolymer (C) is more preferably set to be 48% by mass or less, still more preferably 45% by mass or less.

The melting point $Tm_C$ of the ethylene-based copolymer (C) is preferably set to be 30° C. or higher and 80° C. or lower, more preferably 32° C. or higher and 75° C. or lower, still more preferably 35° C. or higher and 70° C. or lower. By adjusting the melting point $Tm_C$ of the ethylene-based copolymer (C) to fall within the specific range mentioned above, the conductivity of the multilayer foam sheet can be further improved, and the production stability can be further improved in laminating the conductive layer on the polyethylene-based resin foam layer. It is noted that the method for measuring the melting point $Tm_C$ of the ethylene-based copolymer (C) is the same as the method for measuring the melting point $Tm_A$ of the polyethylene-based resin (A) described above.

The difference $Tm_B$–$Tm_C$ between the melting point $Tm_B$ of the polyethylene (B) and the melting point $Tm_C$ of the ethylene copolymer (C) is set to be 30° C. or more and 80° C. or less. By using the ethylene copolymer (C) having the melting point difference from the polyethylene (B) $Tm_B$–$Tm_C$ within the above-mentioned specific range, conductivity can be imparted to the multilayer foam sheet.

When the melting point difference $Tm_B$–$Tm_C$ is less than 30° C., conductivity may not be sufficiently imparted to the multilayer foam sheet. In addition, when the melting point difference $Tm_B$–$Tm_C$ exceeds 80° C., the ethylene-based copolymer (C) tends to adhere to a sizing device or the like in the process of producing the multilayer foam sheet, and a favorable multilayer foam sheet may be less likely to be obtained. In addition, in this case, the handleability may be possibly impaired under such circumstances as softening of the ethylene-based copolymer (C) in use, fusion of multilayer foam sheets to each other in the storage of the multilayer foam sheets stacked on one another, etc.

The melt flow rate of the ethylene-based copolymer (C) at the temperature of 190° C. and under the load of 2.16 kg is preferably 10 g/10 min or more and 120 g/10 min or less, more preferably 20 g/10 min or more and 80 g/10 min or less. In this case, the conductivity of the multilayer foam sheet can be further improved. In addition, by adjusting the melt flow rate of the ethylene-based copolymer (C) to fall within the specific range mentioned above, the adhesive strength between the conductive layer and the layer adjacent to the conductive layer can be further enhanced. For example, when the conductive layer and the polyethylene-based resin foam layer are laminate-bonded, the adhesive strength between both layers can be further enhanced.

<Blending Ratio>

The blending ratio between the polyethylene (B) and the ethylene-based copolymer (C) in the conductive layer is preferably polyethylene (B):ethylene-based copolymer (C)=80:20 to 20:80, more preferably polyethylene (B): ethylene-based copolymer (C)=50:50 to 25:75, more preferably polyethylene (B):ethylene-based copolymer (C)=45: 55 to 30:70 by mass ratio. In this case, the conductivity of the multilayer foam sheet can be further enhanced.

<Conductive Carbon>

The conductive layer contains conductive carbon, that is, a substance mainly composed of carbon atoms and having conductivity. Specific examples of the conductive carbon preferably include conductive carbon black such as furnace black, acetylene black, thermal black, and Ketjen black. The conductive layer may contain two or more types of conductive carbon. From the viewpoint of further reducing the amount of the conductive carbon blended in the multilayer foam sheet while securing the conductivity of the multilayer foam sheet, the conductive layer preferably contains highly conductive carbon black such as Ketjen black as the conductive carbon.

The conductive carbon preferably has a dibutyl phthalate (DBP) oil absorption amount of 150 mL/100 g or more and 700 mL/100 g or less. In this case, the conductivity of the multilayer foam sheet can be further enhanced. From the viewpoint of further enhancing the conductivity of the multilayer foam sheet, the DBP oil absorption amount of the conductive carbon is more preferably 200 mL/100 g or more and 600 mL/100 g or less, still more preferably 300 mL/100 g or more and 600 mL/100 g or less. It is noted that the dibutyl phthalate (DBP) oil absorption amount described above has a value measured in accordance with ASTM D2414-79.

In addition, the conductive carbon preferably has a BET specific surface area of 600 $m^2$/g or more and 2000 $m^2$/g or less. In this case, the conductivity of the multilayer foam sheet can be further enhanced. From the viewpoint of further enhancing the conductivity of the multilayer foam sheet, the BET specific surface area of the conductive carbon is more preferably 700 $m^2$/g or more and 1600 $m^2$/g or less. In the multilayer foam sheet according to the present invention, the conductive layer containing the specific polyethylene (B), ethylene-based copolymer (C), and conductive carbon is formed as a separate layer from the foam layer, thus highly conductive carbon having a large specific surface area can be blended without inhibiting the foamability of the polyethylene-based resin foam layer.

The amount of the conductive carbon blended in the conductive layer is 3% by mass or more and 15% by mass or less. By setting the blending amount of the conductive carbon to be 3% by mass or more, conductivity can be imparted to the multilayer foam sheet. From the viewpoint of further enhancing the conductivity of the multilayer foam sheet, the amount of the conductive carbon blended in the conductive layer is preferably 4% by mass or more, more preferably 5% by mass or more. When the amount of the conductive carbon blended in the conductive layer is excessively small, the conductive carbon particles will be less likely to form a conductive network in the conductive layer, which may lead to decrease in conductivity of the multilayer foam sheet. It is noted that the blending amount of the conductive carbon is roughly equal to the content of the conductive carbon in the conductive layer in the multilayer foam sheet.

In addition, by setting the blending amount of the conductive carbon to be 15% by mass or less, falling of the conductive carbon from the multilayer foam sheet can be curtailed. From the viewpoint of further reducing the conductive carbon falling from the multilayer foam sheet, the amount of the conductive carbon blended is preferably 12% by mass or less, more preferably 10% by mass or less, still more preferably less than 10% by mass. When the amount of the conductive carbon blended in the conductive layer is excessively large, the conductive carbon will be more likely to fall from the multilayer foam sheet, which may cause contamination of the surroundings of the multilayer foam sheet.

<Other Polymers>

The conductive layer may contain therein a polymer other than the polyethylene (B) and the ethylene-based copolymer (C) to the extent that above-described actions and effects are not impaired. Examples of the polymer other than the polyethylene (B) and the ethylene-based copolymer (C) include thermoplastic resins such as a polyethylene-based resin other than the polyethylene (B) and a polystyrene resin, and elastomers such as an ethylene-propylene rubber and a styrene-butadiene-styrene block copolymer. From the viewpoint of production stability in laminating the conductive layer on the polyethylene-based resin foam layer, the conductive layer preferably contains therein no polymer that is higher in melting point than the polyethylene-based resin (A) contained in the polyethylene-based resin foam layer. The content of the polymer other than the polyethylene (B) and the ethylene copolymer (C) in the conductive layer is preferably 20% by mass or less, more preferably 10% by mass or less, still more preferably 5% by mass or less, particularly preferably 3% by mass or less.

<Additive>

The conductive layer may include additives such as an antioxidant, a thermal stabilizer, a weathering agent, an ultraviolet absorber, a flame retardant, a filler, and an antibacterial agent. The amount of the additives blended in the conductive layer is, for example, preferably set to be 10 parts by mass or less, more preferably 5 parts by mass or less, still more preferably 3 parts by mass or less, based on 100 parts by mass in total of the polyethylene (B) and the ethylene-based copolymer (C).

<Average Thickness>

The average thickness of the conductive layer is preferably 1 μm or more and 20 μm or less. By adjusting the average thickness of the conductive layer to be 1 μm or more, more preferably 3 μm or more, still more preferably 5 μm or more, the conductivity of the multilayer foam sheet can be more stably developed. In addition, by adjusting the average thickness of the conductive layer to be 20 μm or less, more preferably 18 μm or less, still more preferably 15 μm or less, particularly preferably 10 μm or less, the conductive carbon can be more effectively kept from falling from the multilayer foam sheet.

Here is a method for measuring the average thickness of the conductive layer. First, the multilayer foam sheet is cut along a plane perpendicular to the extrusion direction. At this cut surface, ten measurement locations are set in such a manner that the length of the cut surface in the longitudinal direction (that is, a direction perpendicular to both the extrusion direction and the thickness direction) is equally divided into eleven parts. Cross sections of the multilayer foam sheet at the measurement locations are observed with the use of a microscope, and the thickness of the conductive layer at each measurement location is measured. The arithmetic mean value of these thicknesses is defined as the average thickness (unit: μm) of the conductive layer.

<Basis Weight>

The basis weight of the conductive layer is preferably 1 g/m² or more and 20 g/m² or less. By adjusting the basis weight of the conductive layer to be 1 g/m² or more, more preferably 5 g/m² or more, still more preferably 7 g/m² or more, the conductivity of the multilayer foam sheet can be more stably developed. In addition, by adjusting the basis weight of the conductive layer to be 20 g/m² or less, more preferably 18 g/m² or less, still more preferably 15 g/m² or less, particularly preferably 10 g/m² or less, the conductive carbon can be more effectively kept from falling from the multilayer foam sheet. It is noted that when the conductive layer is laminated on both sides of the polyethylene-based resin foam layer, the basis weight of the conductive layer means the basis weight per one side.

Here is a method for measuring the basis weight of the conductive layer per one side. First, the average thickness of the conductive layer is calculated by the method described above. The unit of the average thickness is converted, and multiplied by the density (unit: g/m³) of the conductive layer, so that it is possible to obtain the basis weight (unit: g/m²) of the conductive layer. It is noted that the density of the conductive layer is a density including the conductive carbon, other additives, and the like contained in the conductive layer.

In the case of producing the multilayer foam sheet by coextrusion, the basis weight of the conductive layer per one side can also be determined by the following formula (1) with the use of the discharge rate X [g/hour] of the conductive layer per one side, the width W [m] of the multilayer foam sheet, and the take-up speed L [m/hour] of the multilayer foam sheet.

$$\text{Basis Weight of Conductive Layer } [g/m^2] = [X/(L \times W)] \quad (1)$$

In the case of coextruding a conductive-layer forming melt and a foam-layer forming melt to prepare a multilayer foam sheet, such a conductive layer that is small in basis weight and small in thickness can be formed, which fails to be formed by thermal lamination or the like, and the conductivity can be stably developed.

(Method for Producing Multilayer Foam Sheet)

The multilayer foam sheet can be produced by, for example, a coextrusion foaming method. More specifically, in the method for producing a polyethylene-based resin multilayer foam sheet, a foam-layer forming melt for forming a polyethylene-based resin foam layer and a conductive-layer forming melt for forming a conductive layer are coextruded to prepare a polyethylene-based resin multilayer foam sheet including a polyethylene-based resin foam layer and a conductive layer laminated on at least one side of the polyethylene-based resin foam layer. The foam-layer forming melt contains the polyethylene-based resin (A) and a physical foaming agent. The conductive-layer forming melt contains the polyethylene (B), the ethylene-based copolymer (C) having a structural unit derived from ethylene and a structural unit derived from a monomer having a polar group, and the conductive carbon. The amount of the conductive carbon blended in the conductive-layer forming melt is 3% by mass or more and 15% by mass or less. Further, the difference $Tm_B - Tm_C$ between the melting point $Tm_B$ of the polyethylene (B) and the melting point $Tm_C$ of the ethylene-based copolymer (C) is 30° C. or more and 80° C. or less.

For carrying out such a method, known coextrusion devices used in the field of extrusion foaming can be used. More specifically, the multilayer foam sheet can be produced with the use of, for example, a coextrusion device including: a foam-layer formation extruder configured to be capable of extruding the foam-layer forming melt; a conductive-layer formation extruder configured to be capable of extruding the conductive-layer forming melt; and a coextrusion die to which discharge ports of these extruders are connected.

[Foam-Layer Forming Melt]

The foam-layer forming melt contains at least the polyethylene-based resin (A) and a physical foaming agent. The foam-layer forming melt can be prepared, for example, by the following method. First, the polyethylene-based resin (A), and additives added as appropriate, are supplied to a foam-layer formation extruder, and melted and kneaded. Then, the melt containing the polyethylene-based resin (A) is further kneaded in the extruder while the physical foaming agent is supplied thereto under pressure to thereby obtain the foam-layer forming melt.

As the physical foaming agent, organic physical foaming agents or inorganic physical foaming agents can be used. Examples of the organic physical foaming agents include aliphatic hydrocarbons such as propane, normal butane, isobutane, normal pentane, isopentane, normal hexane, and isohexane, alicyclic hydrocarbons such as cyclopentane and cyclohexane, chlorinated hydrocarbons such as methyl chloride and ethyl chloride, and fluorinated hydrocarbons such as 1,1,1,2-tetrafluoroethane and 1,1-difluoroethane. Examples of the inorganic physical foaming agents include nitrogen, carbon dioxide, air, and water. The foam-layer forming melt may include one type of physical foaming agent or two or more types of physical foaming agents.

From the viewpoint of compatibility with the polyethylene-based resin (A) and foamability, the foam-layer forming melt preferably includes an organic physical foaming agent as the physical foaming agent, and more preferably includes an organic physical foaming agent mainly containing normal butane, isobutane, or a mixture thereof.

The amount of the physical foaming agent blended may be appropriately set depending on the type of the foaming agent, the desired apparent density, and the like. For example, in the case of using a mixed butane composed of 30% by mass of an isobutane and 70% by mass of a normal butane as the physical foaming agent, 3 parts by mass or more and 30 parts by mass or less, preferably 4 parts by mass or more and 20 parts by mass or less, more preferably 10 parts by mass or more and 20 parts by mass or less of the mixed butane may be added to 100 parts by mass of the polyethylene-based resin (A).

It is preferable to add a cell adjusting agent into the foam-layer forming melt. As the cell adjusting agent, an inorganic cell adjusting agent and an organic cell adjusting agent can be used. Examples of the inorganic cell adjusting agent include metal borates such as zinc borate, magnesium borate, and borax, sodium chloride, aluminum hydroxide, talc, zeolite, silica, calcium carbonate, and sodium bicarbonate. Examples of the organic cell adjusting agent include sodium 2,2-methylenebis (4,6-tert-butylphenyl) phosphate, sodium benzoate, aluminum benzoate, and sodium stearate. Furthermore, a mixture of citric acid and sodium bicarbonate, a mixture of an alkali salt of citric acid and sodium bicarbonate, or the like can also be used as the cell adjusting agent. The foam-layer forming melt may include therein one type of cell adjusting agent or two or more types of cell adjusting agents. The amount of the cell adjusting agent blended in the foam-layer forming melt may be appropriately set depending on the type of the physical foaming agent, the desired apparent density, the cell diameter, and the like.

[Conductive-Layer Forming Melt]

The conductive-layer forming melt contains therein at least the polyethylene (B), the ethylene-based copolymer (C), and the conductive carbon. For preparing the conductive-layer forming melt, for example, the polyethylene (B), the ethylene-based copolymer (C), the conductive carbon, and additives to be added if necessary are supplied to a conductive-layer formation extruder. Then, these are melted and kneaded in the extruder to thereby obtain the conductive-layer forming melt.

The conductive-layer forming melt may include a volatile plasticizer as an additive. The volatile plasticizer has the action of reducing the melt viscosity of the conductive-layer forming melt, and is composed so as to volatilize from the conductive layer after coextrusion. The volatile plasticizer can bring, in coextrusion, the extrusion temperature of the conductive-layer forming melt close to the extrusion temperature of the foam-layer forming melt. In addition, the volatile plasticizer can improve the melt elongation of the conductive layer softened. As the result thereof, the addition of the volatile plasticizer into the conductive-layer forming melt makes the cells of the polyethylene-based resin foam layer less likely to be broken by the heat of the conductive layer in foaming of the foam-layer forming melt, and further makes the conductive layer more likely to elongate to follow the expansion of the foaming polyethylene-based resin foam layer.

Examples of the volatile plasticizer include an aliphatic hydrocarbon having 3 or more and 7 or less carbon atoms, an alicyclic hydrocarbon having 3 or more and 7 or less carbon atoms, an aliphatic alcohol having 1 or more and 4 or less carbon atoms, and an aliphatic ether having 2 or more and 8 or less carbon atoms. The conductive-layer forming melt may include therein one type of volatile plasticizer or two or more types of volatile plasticizers.

The boiling point of the volatile plasticizer is preferably 120° C. or lower, more preferably 80° C. or lower. The volatile plasticizer with a boiling point in such a range naturally volatilizes from the conductive layer coextruded to be removed from the conductive layer. It is noted that the boiling point of the volatile plasticizer has a lower limit of approximately −50° C.

The amount of the volatile plasticizer blended can be appropriately set depending on the compositions and the like of the conductive layer and the polyethylene-based resin foam layer. For example, the amount of the volatile plasticizer blended may be 5 parts by mass or more and 50 parts by mass or less, based on 100 parts by mass in total of the polyethylene (B) and the ethylene-based copolymer (C). From the viewpoints of further enhancing the followability of the conductive-layer forming melt and reducing the variation in the thickness of the conductive layer, the amount of the volatile plasticizer blended is preferably 5 parts by mass or more, more preferably 7 parts by mass or more, still more preferably 10 parts by mass or more, based on 100 parts by mass in total of the polyethylene (B) and the ethylene-based copolymer (C).

In contrast, from the viewpoint of stably laminating the conductive layer, the amount of the volatile plasticizer blended is preferably set to be 50 parts by mass or less, more preferably 45 parts by mass or less, still more preferably 40 parts by mass or less, based on 100 parts by mass in total of the polyethylene (B) and the ethylene-based copolymer (C).

[Coextrusion]

For coextrusion, as described above, the foam-layer forming melt and the conductive-layer forming melt, formed in each of the extruders, are led to the coextrusion die, and extruded into layers from the extrusion port of the coextrusion die. The coextrusion die may be, for example, a flat die provided with a linear extrusion port. In this case, a laminate of the foam-layer forming melt and the conductive-layer forming melt is extruded into a sheet from the extrusion port of the flat die. When the laminate is extruded from the extrusion port into the atmosphere, the foam-layer forming melt expands while foaming. Accordingly, the conductive-layer forming melt is elongated. Then, the sheet-shaped laminated foam extruded from the extrusion port is cooled while being taken up along a widening device, thereby solidifying the foam-layer forming melt and the conductive-layer forming melt. Thus, the cell structure formed by the foaming is fixed to stabilize the dimensions. As described above, a multilayer foam sheet can be obtained.

Alternatively, the coextrusion die may be, for example, an annular die provided with an annular extrusion port. In this case, a laminate of the foam-layer forming melt and the conductive-layer forming melt is extruded into a tube from the extrusion port of the annular die. When the laminate is extruded from the extrusion port into the atmosphere, the foam-layer forming melt expands while foaming. Accordingly, the conductive-layer forming melt is elongated. Then, the tubular laminated foam extruded from the extrusion port is cooled while being widened from the inside with compressed air or the like and taken up with the inside along a widening device such as a mandrel, thereby solidifying the foam-layer forming melt and the conductive-layer forming melt. Thus, the cell structure formed by the foaming is fixed to thereby stabilize the dimensions. Finally, the tubular laminated foam is cut open on the widening device to obtain a multilayer foam sheet. When an annular die is used as the coextrusion die, a wide multilayer foam sheet is easily produced, which has a width of, for example, 1000 mm or more. In addition, a thin foam sheet is easily produced, which has an overall thickness of, for example, 3 mm or less.

In the past, in order to achieve a surface resistivity of, for example, $1 \times 10^7 \Omega$ or less on a polyethylene-based resin multilayer foam sheet prepared by coextrusion by providing a conductive layer containing conductive carbon, it has been necessary to blend a relatively large amount of conductive carbon in the conductive layer. The reason therefor is considered as follows.

As described above, in the case of trying to prepare a multilayer foam sheet by coextrusion, the foam-layer forming melt, extruded from the coextrusion die, rapidly expands due to the foaming, thus strongly stretching the conductive-layer forming melt so as to follow the expansion of the foam-layer forming melt. In this stretching, the conductive carbon particles in the conductive layer are separated from each other, thus easily making it difficult to maintain the conductive network if the amount of the conductive carbon blended is insufficient.

In addition, the laminated foam extruded from the coextrusion die is rapidly cooled, thus easily solidifying the base resin of the conductive layer with the conductive carbon particles separated from each other by the stretching. Furthermore, the extrusion foaming temperature of the foam-layer forming melt is set to be a relatively low temperature in the range of 100 to 130° C., near the melting point of the polyethylene-based resin (A) constituting the polyethylene-based resin foam layer. Under the extrusion temperature condition for the conductive-layer forming melt, set to be a relatively low temperature correspondingly, the base resin of the conductive layer is more easily solidified. For these reasons, the stable formation of a conductive network in the conductive layer is considered to have been difficult in the conventional multilayer foam sheet prepared by coextrusion.

In contrast, in the multilayer foam sheet, as described above, the conductive layer contains therein the two types of resins that are incompatible with each other: the polyethylene (B); and the ethylene-based copolymer (C) having the structural unit derived from ethylene and the structural unit derived from a monomer having a polar group. Thus, the conductive carbon is considered to be unevenly distributed in any of the phase in the multilayer foam sheet. As a result, a conductive network is considered to be easily formed by the conductive carbon particles, and easily maintained.

Furthermore, because of using, as the ethylene-based copolymer (C), a resin that has a low melting point such that the difference $Tm_B - Tm_C$ in melting point from the polyethylene (B) falls within the specific range, it can be considered that the stretching can be relaxed until the conductive layer is solidified in the cooling process after the coextrusion. As a result, the conductive network is considered to be easily reconstructed.

Accordingly, the production method makes it possible to produce a multilayer foam sheet with conductivity by coextrusion even if the amount of the conductive carbon blended is relatively small. In addition, the production method makes it possible to easily obtain a multilayer foam sheet that is small in thickness, excellent in cushioning property, and less likely to contaminate an object to be packaged.

EXAMPLES

Examples of the multilayer foam sheet and production method therefor will be described below. It is noted that the specific aspects of the multilayer foam sheet and the production method therefor according to the present invention are not to be considered limited to the aspects of the following examples, and the constituents can be appropriately changed without impairing the scope of the present invention.

First, the resin and conductive carbon used in the present examples are shown in Tables 1 and 2.

TABLE 1

| Resin Symbol | Type | Modification Ratio (% by mass) | Melting Point (° C.) | MFR (g/10 min) |
|---|---|---|---|---|
| LDPE1 | Low-density Polyethylene | — | 112 | 2.4 |
| LDPE2 | Low-density Polyethylene | — | 107 | 17 |
| EVA1 | Ethylene-Vinyl acetate Copolymer | 41 | 40 | 65 |
| EVA2 | Ethylene-Vinyl acetate Copolymer | 33 | 61 | 30 |
| EVA3 | Ethylene-Vinyl acetate Copolymer | 33 | 63 | 14 |
| EVA4 | Ethylene-Vinyl acetate Copolymer | 19 | 84 | 15 |
| EMMA1 | Ethylene-Methyl methacrylate Copolymer | 32 | 63 | 450 |
| EMMA2 | Ethylene-Methyl methacrylate Copolymer | 20 | 86 | 20 |
| mLLDPE | Linear Low-density Polyethylene | — | 58 | 30 |

The column "modification ratio" of Table 1 lists the mass fraction (unit: % by mass) of the structural unit derived from the monomer having a polar group in the ethylene-based copolymer. It is noted that because the resins other than the ethylene-based copolymer include no structural unit derived from the monomer having a polar group, a symbol "-" is put in the column of "modification ratio" of Table 1. In addition, the resin symbol "mLLDPE" means a linear low-density polyethylene polymerized with the use of a metallocene catalyst.

In addition, the melting point of each resin in Table 1 has a value measured by the method described above, that is, the testing methods for transition temperatures of plastics, specified in JIS K7121:2012. The column "MFR" of Table 1 lists the melt flow rates measured under the conditions of temperature: 190° C. and load: 2.16 kg, based on the method specified in JIS K7210-1 (2014).

TABLE 2

| Carbon Symbol | Type | Porosity (%) | Primary Particle Size (nm) | DBP Oil Absorption Amount (mL/100 g) | BET Specific Surface Area (m²/g) |
|---|---|---|---|---|---|
| CB1 | Ketjen Black | 60 | 40 | 365 | 800 |

Table 2 shows physical properties of the conductive carbon. In Table 2, the porosity has a value determined by dividing the bulk density of the conductive carbon by the true density of the conductive carbon. The primary particle size has a value determined by observation with a transmission electron microscope. The DBP oil absorption amount has a value measured in accordance with the ASTM D 2414-79. The BET specific surface area has a value determined in accordance with ASTM D 2414.

It is noted that CB1 in Table 2 is specifically "Ketjen Black EC300J" manufactured by LION SPECIALTY CHEMICALS CO., LTD.

Examples 1 to 8

Multilayer foam sheets according to Examples 1 to 8 are non-crosslinked multilayer foam sheets that have a three-layer structure composed of: a polyethylene-based resin foam layer containing the polyethylene-based resin (A); and conductive layers laminated on both sides of the polyethylene-based resin foam layer. The conductive layers contain the polyethylene (B), ethylene-based copolymer (C), and conductive carbon that have the types and amounts shown in Table 3.

The method for producing the multilayer foam sheets according to Examples 1 to 8 is specifically as follows. First, a coextrusion device is prepared which includes: a foam-layer formation extruder, a conductive-layer formation extruder, and a coextrusion die to which discharge ports of these extruders are connected. The coextrusion die in the examples is an annular die with an annular extrusion port.

For preparing a foam-layer forming melt, the polyethylene-based resin (A) of the type shown in Table 3 and 1 part by mass of a cell adjusting agent based on 100 parts by mass of the polyethylene-based resin (A) were supplied to the foam-layer formation extruder, and melted and kneaded in the extruder. It is noted that a mixture of citric acid and sodium bicarbonate ("FINECELL MASTER PO217K" manufactured by Dainichiseika Color & Chemicals Mfg. Co., Ltd.) was used as the cell adjusting agent. The "FINECELL MASTER" is a registered trademark of Dainichiseika Color & Chemicals Mfg. Co., Ltd.

The mixture of the polyethylene-based resin (A) and the cell adjusting agent, which had been melted in the extruder, was further kneaded in the extruder with a physical foaming agent being supplied thereto under pressure. As described above, a foam-layer forming melt having the extrusion temperature shown in Table 3 was obtained. It is noted that mixed butane composed of 65% by mass of normal butane and 35% by mass of isobutane was used as the physical foaming agent. The blending amount of the physical foaming agent was adjusted to be 8 parts by mass, based on 100 parts by mass of the polyethylene-based resin (A).

When preparing the conductive-layer forming melt, the polyethylene (B), ethylene-based copolymer (C), and conductive carbon of the types shown in Table 3 in the amounts shown therein were supplied to the conductive-layer formation extruder, and 25 parts by mass of a volatile plasticizer was supplied thereto, based on 100 parts by mass in total of the polyethylene (B) and the ethylene-based copolymer (C). Then, these were kneaded in the extruder to obtain a conductive-layer forming melt having the extrusion temperature shown in Table 3. It is noted that mixed butane composed of 65% by mass of normal butane and 35% by mass of isobutane was used as the volatile plasticizer.

The melts thus prepared in the respective extruders were simultaneously supplied to the coextrusion die with the extrusion temperature shown in Table 3 being maintained, and joined in the coextrusion die such that the conductive-layer forming melt was laminated on both sides of the foam-layer forming melt. Then, these melts were coextruded from the extrusion port of the coextrusion die in the discharge rates shown in Table 3 and then foamed to prepare a tubular laminated foam with conductive layers laminated on both sides of a polyethylene-based resin foam layer. It is noted that the discharge rate of the conductive layer, shown in Table 3, is a discharge rate per one side. A mandrel of 360 mm in diameter was inserted inside the laminated foam. The laminated foam was cut open with being taken up along the mandrel at the take-up speed shown in Table 3 to thereby provide the multilayer foam sheets according to Examples 1 to 8. The multilayer foam sheets according to Examples 1 to 8 have the values shown in Table 3 in width, overall thickness, basis weight, and apparent density. In addition, the conductive layers of these multilayer foam sheets were all non-foamed.

Comparative Example 1

A multilayer foam sheet according to Comparative Example 1 is the same as the multilayer foam sheet according to Example 1 except that the conductive layer contains no ethylene-based copolymer (C). The method for producing the multilayer foam sheet according to Comparative Example 1 is the same as the method for producing the multilayer foam sheet according to Example 1 except that no ethylene-based copolymer (C) was blended in the conductive-layer forming melt and the production conditions and the like are changed as shown in Table 4.

Comparative Examples 2 and 4

Multilayer foam sheets according to Comparative Examples 2 and 4 have the same constituents as the multilayer foam sheet according to Example 1 except that the difference $Tm_B - Tm_C$ in melting point between the polyethylene (B) and the ethylene-based copolymer (C) in the conductive layer falls outside the specific range mentioned above. The method for producing the multilayer foam sheets according to Comparative Examples 2 and 4 is the same as the method for producing the multilayer foam sheet according to Example 1, except that the type of the ethylene-based copolymer (C), the production conditions, and the like were changed as shown in Table 4.

Comparative Example 3

A multilayer foam sheet according to Comparative Example 3 has the same constituents as the multilayer foam sheet according to Example 1 except that the conductive layer contains a linear polyethylene in place of the ethylene-based copolymer (C). The method for producing the multilayer foam sheet according to Comparative Example 3 is the same as the method for producing the multilayer foam sheet according to Example 1 except that the composition of the conductive-layer forming melt, the production conditions, and the like were changed as shown in Table 4.

Comparative Example 5

A multilayer foam sheet according to Comparative Example 5 has the same constituents as the multilayer foam sheet according to Comparative Example 1 except that the amount of the conductive carbon blended in the conductive layer was increased. The method for producing the multilayer foam sheet according to Comparative Example 5 is the same as the method for producing the multilayer foam sheet according to Comparative Example 1 except that the amount of the conductive carbon blended in the conductive-layer forming melt, the production conditions, and the like were changed to the values shown in Table 4.

(Evaluation)

For the examples and the comparative examples, the melt viscosity of the conductive layer of the multilayer foam sheet, the overall thickness and basis weight of the multilayer foam sheet, the average thickness and basis weight of the conductive layer of the multilayer foam sheet, the apparent density, the foaming ratio, the contamination, and the conductivity were evaluated by the following methods.

[Melt Viscosity of Conductive Layer]

The melt viscosity of the conductive-layer forming melt according to each of Examples 1 to 8 and Comparative Examples 1 to 5 was measured using a capillary rheometer ("Rheobis 2100" manufactured by Thiast). It is noted that the measurement was performed under the conditions of measurement temperature: 190° C. and shear rate: 100 se-1, with the orifice diameter and orifice length of the capillary rheometer respectively set to 1 mm and 10 mm. The melt viscosities of the melts for conductive layer formation according to the examples and the comparative examples were set as shown in Table 3 or 4.

[Overall Thickness of Multilayer Foam Sheet]

First, the multilayer foam sheet was cut along a plane perpendicular to the extrusion direction. At this cut surface, ten measurement locations were set so as to be equal in interval in the longitudinal direction (that is, a direction perpendicular to both the extrusion direction and the thickness direction) of the cut surface. These measurement locations were observed using a microscope, and the thickness of each measurement location was measured. The arithmetic mean value of these thicknesses was defined as the overall thickness of the multilayer foam sheet, and listed in Tables 3 and 4.

[Basis Weight of Multilayer Foam Sheet]

From the multilayer foam sheet, a square test piece of 25 mm on a side was collected, and the mass (unit: g) of the test piece was measured. The mass of the test piece was subjected to unit conversion to calculate the basis weight of the multilayer foam sheet, that is, the mass (unit: g/m$^2$) per 1 m$^2$ of the multilayer foam sheet. The basis weights of the multilayer foam sheets according to the examples and the comparative examples were as shown in Table 3 or 4.

[Average Thickness of Conductive Layer]

The multilayer foam sheet was cut along a plane perpendicular to the extrusion direction. At this cut surface, ten measurement locations were set so as to be equal in interval in the longitudinal direction (that is, a direction perpendicular to both the extrusion direction and the thickness direction) of the cut surface. The cross section of the multilayer foam sheet at these measurement locations was observed using a microscope, and the thickness of the conductive layer at each measurement location was measured. The arithmetic mean value of these thicknesses was defined as the average thickness (unit: μm) of the conductive layer. The average thicknesses of the conductive layers in the multilayer foam sheets according to the examples and the comparative examples were as shown in Table 3 or 4.

[Basis Weight of Conductive Layer]

The basis weight of the conductive layer per one side was calculated based on the following formula (1), with the use of the discharge rate X [g/hour] of the conductive layer per one side, the width W [m] of the multilayer foam sheet, and the take-up speed L [m/hour] of the multilayer foam sheet during coextrusion of the multilayer foam sheet.

$$\text{Basis Weight of Conductive Layer } [g/m^2] = [X/(L \times W)] \quad (1)$$

[Apparent Density of Multilayer Foam Sheet]

The basis weight (unit: g/m$^2$) of the multilayer foam sheet, obtained by the method described above, was divided by the overall thickness of the multilayer foam sheet, and then subjected to unit conversion to calculate the apparent density (unit: kg/m$^3$) of the multilayer foam sheet.

[Contamination]

After the multilayer foam sheets according to the examples and the comparative examples were overlapped with clean paper, the multilayer foam sheets were pressed against the clean paper with a load of 150 g/cm$^2$. In this condition, the multilayer foam sheets were reciprocated with respect to the clean paper to slide the multilayer foam sheets and the clean paper. It is noted that the amplitude of the reciprocation was adjusted to be 5 mm, and the cycle was adjusted to be 1 second.

At the time after a lapse of 100 seconds from the start of the sliding, the multilayer foam sheets were removed from the clean paper. Then, the color tones of the clean paper were measured using a spectral colorimeter ("SE-2000" manufactured by NIPPON DENSHOKU INDUSTRIES CO., LTD.), and the values L* in the CIE 1976 L*a*b* color space were acquired on the parts slid on the multilayer foam sheets. Then, contamination of the multilayer foam sheets was evaluated on the basis of the differences between the values L* of the clean paper before being slid on the multilayer foam sheets, measured in advance, and the values L* of the clean paper slid.

The columns "contamination" of Tables 3 and 4 list a value ΔL* that is a value obtained by subtracting the value L* of the clean paper slid from the value L* of the clean paper before being slid. The value L* is a value that represents lightness, and the increased value L* means a brighter color tone. Sliding of the multilayer foam sheet and the clean paper causes the conductive carbon falling from the multilayer foam sheet to adhere to the clean paper. Then, the increased amount of the conductive carbon adhering to the clean paper makes the color tone of the clean paper darker. Accordingly, the multilayer foam sheet that is smaller in the value ΔL* shown in the columns "contamination" of Tables 3 and 4 can be considered less likely to cause the conductive carbon to fall from the multilayer foam sheet, and less likely to contaminate the surroundings.

[Conductivity]

The surface resistivity of the conductive layer was measured by the measurement method in accordance with JIS K6271-1: 2015. Specifically, a test piece in a square shape of 100 mm on a side was collected from the multilayer foam sheet. After attaching electrodes to the conductive layer surface of the test piece, a voltage of 1 V was applied across the electrodes in an atmosphere at a temperature of 23° C. and a relative humidity of 50%. Then, the surface resistivity (unit: Ω) at the time after a lapse of 1 minute from the application of the voltage was regarded to be the surface resistivity of the multilayer foam sheet. It is noted that "Hiresta UX MCP-HT800" manufactured by Nittoseiko Analytech Co., Ltd. was used for the measurement of the surface resistivity. The surface resistivities of the multilayer foam sheets according to the examples and the comparative examples were as shown in Table 3 or 4.

TABLE 3

| | | | Example 1 | Example 2 | Example 3 | Example 4 | Example 5 | Example 6 | Example 7 | Example 8 |
|---|---|---|---|---|---|---|---|---|---|---|
| Foam Layer | Polyethylene-based Resin (A) | Type | LDPE1 | LDPE1 | LDPE1 | LDPE1 | LDPE1 | LDPE1 | LDPE1 | LDPE1 |
| Conductive Layer | Polyethylene (B) | Type | LDPE2 | LDPE2 | LDPE2 | LDPE2 | LDPE2 | LDPE2 | LDPE2 | LDPE2 |
| | | Melting Point $Tm_B$ °C | 107 | 107 | 107 | 107 | 107 | 107 | 107 | 107 |
| | Ethylene-based Copolymer (C) | Type | EVA1 | EVA1 | EVA2 | EMMA1 | EVA3 | EVA1 | EVA1 | EVA1 |
| | | Melting Point $Tm_C$ °C | 40 | 40 | 61 | 63 | 63 | 40 | 40 | 40 |
| | Conductive Carbon | Type | CB1 | CB1 | CB1 | CB1 | CB1 | CB1 | CB1 | CB1 |
| | | Blending Amount % by mass | 6.5 | 6.5 | 6.5 | 6.5 | 9 | 6.5 | 9 | 6.5 |
| | Difference in melting point $Tm_B - Tm_C$ | °C | 67 | 67 | 46 | 44 | 44 | 67 | 67 | 67 |
| | Mass Ratio (B):(C) | — | 35:65 | 35:65 | 35:65 | 35:65 | 50:50 | 35:65 | 70:30 | 35:65 |
| | Melt Viscosity | Pa·s | 372 | 372 | 472 | 118 | 769 | 372 | 518 | 372 |
| | Average Thickness | μm | 12 | 7 | 12 | 9 | 12 | 6 | 8 | 4 |
| | Basis Weight | g/m² | 11 | 7.3 | 11 | 8.5 | 11 | 5.5 | 7.2 | 4.1 |
| Production Conditions | Foam Layer | Extrusion Temperature °C | 111 | 111 | 111 | 112 | 111 | 111 | 111 | 111 |
| | | Discharge Rate kg/hr | 70 | 70 | 70 | 70 | 62 | 78 | 62 | 62 |
| | Conductive Layer | Extrusion Temperature °C | 125 | 125 | 125 | 124 | 125 | 125 | 125 | 125 |
| | | Discharge Rate kg/hr | 12 | 12 | 12 | 11 | 7.8 | 7.8 | 5.2 | 3.0 |
| | Takeoff Speed | m/min | 17 | 27 | 17 | 21 | 11 | 23 | 11 | 11 |
| Multilayer Foam Sheet | Width | mm | 1077 | 1047 | 1063 | 1042 | 1105 | 1050 | 1101 | 1085 |
| | Overall Thickness | mm | 1.2 | 0.8 | 1.3 | 1.3 | 1.2 | 1.0 | 1.0 | 1.0 |
| | Basis Weight | g/m² | 86 | 56 | 86 | 70 | 106 | 66 | 100 | 93 |
| | Apparent Density | kg/m³ | 72 | 70 | 66 | 54 | 89 | 66 | 100 | 93 |
| Evaluation Result | Contamination | — | 0.72 | 0.53 | 0.68 | 0.80 | 1.08 | 0.98 | 0.75 | 0.36 |
| | Surface Resistivity | Ω | $1.4 \times 10^6$ | $2.1 \times 10^6$ | $7.6 \times 10^6$ | $4.1 \times 10^5$ | $1.4 \times 10^6$ | $7.1 \times 10^6$ | $7.4 \times 10^6$ | $6.5 \times 10^6$ |

TABLE 4

| | | | Comparative Example 1 | Comparative Example 2 | Comparative Example 3 | Comparative Example 4 | Comparative Example 5 |
|---|---|---|---|---|---|---|---|
| Foam Layer | Polyethylene-based Resin (A) | Type | LDPE1 | LDPE1 | LDPE1 | LDPE1 | LDPE1 |
| Conductive Layer | Polyethylene (B) | Type | LDPE2 | LDPE2 | LDPE2 | LDPE2 | LDPE2 |
| | | Melting Point $Tm_B$ °C | 107 | 107 | 107 | 107 | 107 |
| | Ethylene-based Copolymer (C) | Type | — | EVA4 | mLLDPE | EMMA2 | — |
| | | Melting Point $Tm_C$ °C | — | 84 | 58 | 86 | — |
| | Conductive Carbon | Type | CB1 | CB1 | CB1 | CB1 | CB1 |
| | | Blending Amount % by mass | 6.5 | 6.5 | 6.5 | 6.5 | 15 |
| | Difference in melting point $Tm_B - Tm_C$ | °C | — | 23 | 49 | 18 | — |
| | Mass Ratio (B):(C) | — | 100:0 | 35:65 | 35:65 | 35:65 | 100:0 |
| | Melt Viscosity | Pa·s | 660 | 560 | 470 | 564 | 1674 |
| | Average Thickness | μm | 12 | 12 | 9 | 9 | 9 |
| | Basis Weight | g/m² | 11 | 11 | 8.5 | 8.5 | 8.5 |
| Production Conditions | Foam Layer | Extrusion Temperature °C | 111 | 111 | 111 | 111 | 111 |
| | | Discharge Rate kg/hr | 78 | 68 | 70 | 77 | 77 |
| | Conductive Layer | Extrusion Temperature °C | 126 | 126 | 127 | 127 | 125 |
| | | Discharge Rate kg/hr | 12 | 12 | 12 | 11 | 11 |
| | Takeoff Speed | m/min | 17 | 17 | 22 | 21 | 21 |
| Multilayer Foam Sheet | Width | mm | 1070 | 1063 | 1057 | 1041 | 1041 |
| | Overall Thickness | mm | 1.5 | 1.2 | 1.1 | 1.2 | 1.1 |
| | Basis Weight | g/m² | 93 | 84 | 67 | 76 | 76 |
| | Apparent Density | kg/m³ | 62 | 70 | 61 | 64 | 69 |
| Evaluation Result | Contamination | — | 2.71 | 0.66 | 2.14 | 1.39 | 3.77 |
| | Surface Resistivity | Ω | $2.9 \times 10^{12}$ | $9.7 \times 10^{11}$ | $5.8 \times 10^{13}$ | $5.8 \times 10^{11}$ | $1.1 \times 10^5$ |

As shown in Table 3, the conductive layers of the multilayer foam sheets according to Examples 1 to 8 contain the polyethylene (B), the ethylene-based copolymer (C) having the structural unit derived from ethylene and the structural unit derived from a monomer having a polar group, and the conductive carbon. In addition, in the conductive layers of the multilayer foam sheets according to Example 1 to 8, the blending amount of the conductive carbon and the difference $Tm_B$–$Tm_C$ in melting point between the polyethylene (B) and the ethylene-based copolymer (C) fall within the specific ranges mentioned above. Further, according to Examples 1 to 8, the conductive layers that have such constituents are laminated on and bonded to the polyethylene-based resin foam layers by coextrusion. The multilayer foam sheets according to Examples 1 to 8 have a surface resistivity of $1\times10^7\Omega$ or less and make it possible to reduce the conductive carbon falling from the multilayer foam sheets.

From a comparison between Tables 3 and 4, it can be understood the multilayer foam sheet including the conductive layer that has the specific composition mentioned above shows excellent conductivity even when the amount of the conductive carbon blended in the conductive layer is a relatively small amount such as 10% by mass or less. In addition, for example, from comparisons between Example 1 and Comparative Example 1 and between Example 4 and Comparative Example 4 in each of which the same amount of the conductive carbon is blended in the conductive layer, it can be understood the multilayer foam sheet including the conductive layer that has the specific composition mentioned above is small in value ΔL*, and capable of reducing contamination of the surroundings.

The invention claimed is:

1. A polyethylene-based resin multilayer foam sheet, comprising:
    a polyethylene-based resin foam layer comprising a polyethylene-based resin (A) as a base resin; and
    a conductive layer laminated on at least one side of the polyethylene-based resin foam layer,
    wherein the conductive layer comprises:
    a mixed resin comprising a polyethylene (B) comprising (B1) a low-density polyethylene and/or (B2) a linear low-density polyethylene and an ethylene-based copolymer (C) comprising a structural unit derived from (C1) ethylene and a structural unit derived from (C2) a monomer comprising a polar group; and
    conductive carbon blended in the mixed resin,
    wherein the conductive carbon is blended in the conductive layer in a range of from 3 to 15% by mass,
    wherein a $Tm_B$–$Tm_C$ difference between a melting point, $Tm_B$, of the polyethylene (B) in the conductive layer and a melting point, $Tm_C$, of the ethylene-based copolymer (C) in the conductive layer is in a range of from 30 to 80° C.,
    wherein the conductive layer has an average thickness of 1 to 15 μm,
    wherein the multilayer foam sheet has a surface resistivity in a range of from $1\times10^3$ to $1\times10^7\Omega$, on a surface thereof on a side having the conductive layer provided thereon, and
    wherein a (B):(C) mass blending ratio of the polyethylene (B) to the ethylene-based copolymer (C) in the conductive layer is in a range of from 80:20 to 20:80.

2. The sheet of claim 1, wherein a (B):(C) mass blending ratio of the polyethylene (B) to the ethylene-based copolymer (C) in the conductive layer is in a range of from 50:50 to 25:75.

3. The sheet of claim 1, wherein a content of the structural unit derived from the monomer (C2) in the ethylene-based copolymer (C) is in a range of from 30 to 50% by mass.

4. The sheet of claim 1, wherein the ethylene-based copolymer (C) comprises an ethylene-vinyl acetate copolymer and/or an ethylene-methyl methacrylate copolymer.

5. The sheet of claim 1, wherein the ethylene-based copolymer (C) has a melt flow rate in a range of from 20 to 100 g/10 min at a temperature of 190° C. and under a load of 2.16 kg.

6. The sheet of claim 1, wherein the conductive layer has a basis weight in a range of from 1 to 20 g/m².

7. The sheet of claim 1, having an apparent density in a range of from 30 to 150 kg/m³.

8. The sheet of claim 1, having an overall thickness in a range of from 0.05 to 3.0 mm.

9. The sheet of claim 1, wherein the conductive carbon has a dibutyl phthalate oil absorption in a range of from 200 to 600 mL/100 g.

10. The sheet of claim 1, wherein the mixed resin comprises the low-density polyethylene (B1) in the polyethylene (B).

11. The sheet of claim 1, wherein the mixed resin comprises the linear low-density polyethylene (B2) in the polyethylene (B).

12. The sheet of claim 1, wherein the mixed resin comprises the low-density polyethylene (B1) and the linear low-density polyethylene (B2) in the polyethylene (B).

13. The sheet of claim 1, wherein the ethylene-based copolymer (C) comprises an ethylene-vinyl acetate copolymer.

14. The sheet of claim 1, wherein the ethylene-based copolymer (C) comprises an ethylene-methyl methacrylate copolymer.

15. The sheet of claim 1, wherein the ethylene-based copolymer (C) comprises an ethylene-vinyl acetate copolymer and an ethylene-methyl methacrylate copolymer.

16. A method for producing a polyethylene-based resin multilayer foam sheet, the method comprising:
    coextruding a foam-layer forming melt to form a polyethylene-based resin foam layer and a conductive-layer forming melt to form a conductive layer so that a polyethylene-based resin multilayer foam sheet comprising the polyethylene-based resin foam layer and the conductive layer laminated on at least one side of the polyethylene-based resin foam layer is produced, wherein
    the foam-layer forming melt is obtained by kneading a polyethylene-based resin (A) as a base resin and a physical foaming agent,
    the conductive-layer forming melt is obtained by kneading one or more polyethylenes (B) comprising (B1) a low-density polyethylene and/or (B2) a linear low-density polyethylene, and an ethylene-based copolymer (C) comprising a structural unit derived from (C1) ethylene and a structural unit derived from (C2) a monomer comprising a polar group, and conductive carbon,
    wherein an amount of the conductive carbon blended in the conductive-layer forming melt is in a range of from 3 to 15% by mass,
    wherein the conductive layer has an average thickness of 1 to 15 μm,
    wherein the multilayer foam sheet has a surface resistivity in a range of from $1\times10^3$ to $1\times10^7\Omega$, on a surface thereof on a side having the conductive layer provided thereon,
    wherein,
    wherein a (B):(C) mass blending ratio of the polyethylene (B) to the ethylene-based copolymer (C) in the conductive layer is in a range of from 80:20 to 20:80, and wherein a $Tm_B$–$Tm_C$ difference between a melting point $Tm_B$ of the polyethylene (B) and a melting point $Tm_C$ of the ethylene-based copolymer (C) is in a range of from 30 to 80° C.

* * * * *